US006725204B1

(12) United States Patent
Gusley

(10) Patent No.: US 6,725,204 B1
(45) Date of Patent: Apr. 20, 2004

(54) SYSTEM FOR FACILITATING THE SALE AND SHIPMENT OF CORES

(76) Inventor: Mark R. Gusley, 8454 Newcomb Dr., Parma, OH (US) 44129

(*) Notice: Subject to any disclaimer, the term of this patent is extended or adjusted under 35 U.S.C. 154(b) by 483 days.

(21) Appl. No.: 09/614,289

(22) Filed: Jul. 12, 2000

(51) Int. Cl.[7] .............................................. G06F 17/60
(52) U.S. Cl. ............................ 705/26; 705/29; 705/37
(58) Field of Search .............................. 705/14, 22, 30, 705/37, 26, 29

(56) References Cited

U.S. PATENT DOCUMENTS

| 4,799,156 A | * | 1/1989 | Shavit et al. ................. 705/30 |
| 4,992,940 A | | 2/1991 | Dworkin ..................... 364/401 |
| 5,168,444 A | * | 12/1992 | Cukor et al. .................. 705/30 |
| 5,367,627 A | | 11/1994 | Johnson ...................... 395/161 |
| 5,592,375 A | * | 1/1997 | Salmon et al. ................ 705/22 |
| 5,593,269 A | * | 1/1997 | Bernard, II ................. 414/331 |
| 5,694,551 A | * | 12/1997 | Doyle et al. .................. 705/30 |
| 5,715,402 A | * | 2/1998 | Popolo ........................ 705/37 |
| 5,758,328 A | | 5/1998 | Giovannoli .................. 705/26 |
| 5,794,207 A | * | 8/1998 | Walker et al. ................ 705/26 |
| 5,842,178 A | | 11/1998 | Giovannoli .................. 705/26 |
| 5,940,807 A | | 8/1999 | Purcell ........................ 705/26 |
| 5,950,178 A | | 9/1999 | Borgato ....................... 705/37 |
| 6,014,644 A | * | 1/2000 | Erickson ...................... 705/26 |
| 2002/0032613 A1 | * | 3/2002 | Buettgenbach et al. ....... 705/26 |

FOREIGN PATENT DOCUMENTS

EP 1 111 529 A2 * 6/2001 ........... G06F/17/60

OTHER PUBLICATIONS

Daganzo "Shipment Composition Enhancement at a Consolidation Center" Apr. 1988, Transportation Research, vol. 22B, no2 pp. 103–24.*

* cited by examiner

Primary Examiner—Lynda Jasmin
(74) Attorney, Agent, or Firm—Rankin, Hill, Porter & Clark LLP

(57) ABSTRACT

The present invention provides a system for facilitating the sale and shipment of cores. The system includes a host processor that stores and processes data supplied by a plurality of vendors. The data includes the type quantity and asking price of cores the vendors have available for sale. The data is transferred from the host processor over a data link to a remote terminal for display to a purchaser of cores. An order is communicated from the purchaser to the host computer. The order includes an offer price to purchase at least one of the cores displayed on the remote terminal. The host processor compares the offer price with the asking price, and when the offer price meets or exceeds the asking price for a core, notifies the vendor of the core and the purchaser that a sale has been made. The host processor instructs the vendor of the core to send the core to a consolidation center, where the core is inspected and packaged for shipment to the purchaser in accordance with a set of instructions generated by the host processor in response to the order. The host processor also generates an invoice to the purchaser for the cores included in the order.

22 Claims, 4 Drawing Sheets

FIG. 4

401 { Category 402
User Name
407
Part # 403
Description 404
Quantity Needed 405
Target Price 406
$
400
[Submit] 408
[Reset]

FIG. 5

User Name 506
501 {
Domestic Starters 502
Part Numbers 503
Quantity 504
Selling Price 505
$
500
507 [Submit] [Reset]

FIG. 6

601 {
Category 602
Part # 603
Description/Lester number 604
600
[Search] 605

SYSTEM FOR FACILITATING THE SALE AND SHIPMENT OF CORES

FIELD OF INVENTION

The present invention relates to a system and method for facilitating the sale and shipment of cores. More particularly, the present invention relates to a system and method for facilitating the sale and shipment of cores from a plurality of vendors to a purchaser that utilizes a host processor and at least one consolidation center where cores are inspected and packaged for shipment to the purchaser as a single delivery.

BACKGROUND OF THE INVENTION

A substantial worldwide market exists for certain remanufactured motor vehicle parts including, for example, anti-lock braking system (ABS) units, air-conditioning compressors, air flow sensors, alternators, rotors, stators, brake boosters and hydroboosts, brake shoes, brake calipers, catalytic converters, clutches, and clutch plates, cruise control transducers, distributors, electronic control modules, electronic controls and instruments, electronic cruise servos, engines, heads, crank shafts and cam shafts, front wheel drive axles, front wheel drive shafts, late master cylinders, power steering pumps, rack and pinion units (power and manual), radiator fan motors, smog pumps, spark controls, starters, armatures and drives, steering gear boxes (power and manual), struts, transmissions and converters, turbochargers, water pumps, window lift motors and wiper motors. To meet market demands, remanufacturers of such motor vehicle parts must frequently purchase a supply of used motor vehicle parts, which are known as "cores" in the industry, from one or more vendors for use in the remanufacturing processes.

Traditionally, business transactions between vendors of cores and purchasers of cores have been somewhat primitive. Typically, purchasers contact a number of known vendors by telephone or facsimile and provide them with a description of their current core needs, which sometimes includes a listing of hundreds of Stock Keeping Unit (SKU) numbers. Responses to the purchasers' requests trickle in over several weeks because many smaller vendors have no modern inventory systems and must make physical counts of their core inventory. In some instances, vendors of cores simply do not respond to the purchasers' requests. After receiving a sufficient number of responses from vendors, the purchasers make purchasing decisions based upon such factors as the quantities of parts available, the prices quoted by the core vendors, and the reliability of the particular core vendor. Usually, cores are then shipped to the purchasers from a number of vendors, which results in numerous invoices and deliveries coming in over several weeks.

This traditional manner of transacting business in the core industry is inherently disadvantageous for both the vendors and purchasers of cores. From the purchasers' perspective, the process is time consuming because it takes considerable time to: (1) receive an adequate number of responses from vendors; (2) make a purchasing decision; (3) execute purchase agreements with a number of different vendors: and (4) receive shipments from a number of different vendors. Additionally, the traditional manner of transacting business places additional pressure on purchasers to carefully monitor the numerous individual shipments coming in from vendors so that proper credits can be obtained for broken units, improperly identified units, short shipments, and the like.

From the vendors' perspective, the traditional manner of transacting business is also disadvantageous because it requires vendors to quickly respond to numerous requests from a number of purchasers in order to optimize the chances of making a sale. The vendor can sometimes be put into an awkward position if, for example, two or more different purchasers of cores to whom the vendor has responded then place an order the same cores. Furthermore, because vendors have a limited market for their cores, unless they are fortunate to receive requests from purchasers, they must invest time and effort to repeatedly solicit purchasers who may or may not be in need of the cores a particular vendor may have in inventory at any given time.

Several recent trends in the motor vehicle industry have had a profound effect on the core market. The rapid increase in the technological sophistication of motor vehicles over the past decade has driven many small remanufacturing companies out of certain markets. Also, there has been an increase in the number of national chain-type motor vehicle parts retailers. The companies selling remanufactured parts to these national chain-type motor vehicle parts retailers have been growing increasingly larger and have purchased many of their smaller competitors. Accordingly, the purchasing side of the core market is now dominated by a few relatively large remanufacturing companies.

Although the large remanufacturing companies need large volumes of cores to satisfy market demands, they prefer to transact business with as few core vendors as possible in order to minimize the number of individual shipments received, invoices, and other administrative complexities that result when a large number of vendors are shipping a variety of cores to them. Because larger core vendors have the ability to supply larger volumes of cores to larger remanufacturers than smaller core vendors can, there has been a growing preference among larger remanufacturers to transact business almost exclusively with the larger core vendors. The limited market for cores coupled with the preference of the larger remanufacturers to transact business with larger core vendors has forced many of the smaller core vendors to either go out of business or begin selling their cores to the larger core vendors well below the price currently being paid by remanufacturers to purchase such cores on the open market. This situation essentially prevents smaller vendors of cores from growing their business. A system is needed that would advantageously permit core vendors and remanufacturers of all sizes to quickly and efficiently transact business with each other.

SUMMARY OF THE INVENTION

The present invention is directed to a system and method for facilitating the sale and shipment of cores. The system according to the present invention comprises a host processor having means for storing and processing data supplied by a plurality of vendors relating to the type and quantity of cores each of the vendors has available for sale. The system further comprises means for transferring said data from said host processor over a data link to a remote terminal for display to a purchaser of cores. The system further comprises means for said host processor to receive an order from said purchaser to purchase at least one of said cores displayed as available for sale on said remote terminal. The system further comprises at least one consolidation center having means for inspecting cores received from the vendors and means for packaging the cores for shipment to the purchaser according to a set of instructions generated in response to the order. The system also comprises means for generating an invoice to the purchaser for the cores included in the order.

The method according to the present invention comprises: providing a host processor having means for storing and processing data supplied by a plurality of vendors relating to the type and quantity of cores each of the vendors has available for sale; displaying the data to a purchaser on a remote terminal that is in communication with the host processor via a data link; processing an order received from the purchaser to purchase one or more cores; notifying the purchaser and each of the vendors of a core that is included as part of said order that a sale has been made; providing at least one consolidation center for receiving the cores from the vendors; inspecting and repackaging the cores at the consolidation center according to a set of instructions generated by the host processor in response to the order; generating a single invoice for the order; and delivering the order to said purchaser as a single delivery. The method according to the present invention advantageously permits core vendors and remanufacturers of all sizes to quickly and efficiently transact business with each other.

These and other features and advantages provided by the system and method according to the present invention are set forth in detail in the accompanying specification. The drawings constitute a part of the specification and graphically illustrate various objects and features thereof.

BRIEF DESCRIPTION OF DRAWINGS

FIG. 4 shows one embodiment of a data entry template for use with the present invention.

FIG. 5 shows one embodiment of another data entry template for use with the present invention.

FIG. 6 shows one embodiment of yet another data entry template for use with the present invention.

DETAILED DESCRIPTION OF THE PREFERRED EMBODIMENTS

Figure 1:
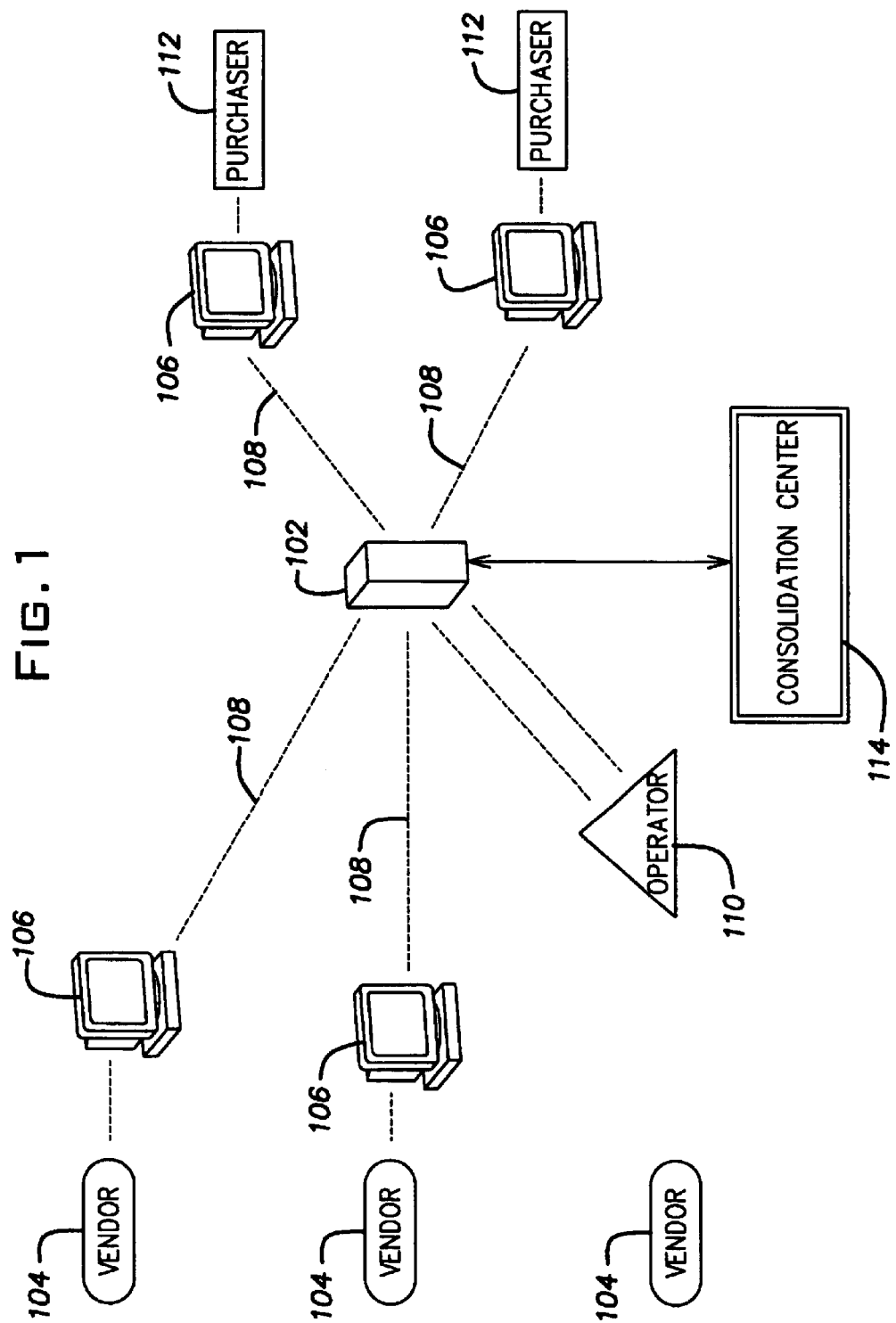
FIG. 1 is a block diagram showing the arrangement of various components of the system according to the present invention.

Throughout this specification and in appended claims the word "core" means a used motor vehicle component, part, or assembly that can be remanufactured, reconditioned, and/or resold. Examples of cores include, but are not limited to, anti-lock braking system (ABS) units, air-conditioning compressors, air flow sensors, alternators, rotors, stators, brake boosters and hydroboosts, brake shoes, brake calipers, catalytic converters, clutches, and clutch plates, cruise control transducers, distributors, electronic control modules, electronic controls and instruments, electronic cruise servos, engines, heads, crank shafts and cam shafts, front wheel drive axles, front wheel drive shafts, master cylinders, power steering pumps, rack and pinion units (power and manual), radiator fan motors, smog pumps, spark controls, starters, armatures and drives, steering gear boxes (power and manual), struts, transmissions and converters, turbochargers, water pumps, window lift motors and wiper motors.

The present invention is directed to a system and method for facilitating the sale and shipment of cores from a plurality of vendors to a purchaser. The system comprises a host processor having means for storing and processing data supplied by a plurality of vendors relating to the type and quantity of cores the vendors have available for sale; means for transferring said data from said host processor over a data link to a remote terminal for display to a purchaser of cores; means for said host processor to receive an order from said purchaser to purchase at least one of said cores displayed as available for sale on said remote terminal; at least one consolidation center having means for inspecting cores received from the vendors and means for packaging the cores for shipment to the purchaser according to a set of instructions generated in response to the order; and means for generating an invoice to the purchaser for the cores included in the order. The various components of the system according to the invention are separately described in greater detail below.

The host processor must have means for storing and processing data supplied by a plurality of vendors relating to the type and quantity of cores each of the vendors has available for sale. Preferably, the host processor comprises one or a plurality of interconnected computers having data processing and storage capabilities. Those skilled in the art will recognize that the host processor can comprise any one or a combination of computing platforms such as mainframes, minicomputers, and microcomputers. The host processor is preferably operating system independent. In the presently most preferred embodiment, the host processor is an SQL server.

The host processor preferably stores the data supplied by the plurality of vendors as records in one or more databases. Each record in a database is formatted to a base data entry template having a plurality of fields. Each field in the base data entry template contains a specific type of information. Preferably, the databases are updated on a real-time basis.

Most cores can be positively identified by an original equipment manufacturer (OEM) number or other distinctive part number such as, for example, part numbers used by the Lester Catalog Company of Newcastle, Calif. Preferably, the host processor is programmed to recognize OEM numbers or distinctive part numbers and automatically enter certain known information about a particular core in various fields in the base data entry template. The use of OEM number or distinctive part number recognition helps avoid problems that can arise if inconsistent descriptions or part numbers of the cores are entered in fields of the base data entry template, and also helps avoid data entry burdens and mistakes.

Transaction information is also preferably stored in one or more databases. Transaction information includes, for example, the identities and contact information for the plurality of vendors having cores available for sale, the identities and contact information for purchasers who are authorized to utilize the system, the status of cores that have been ordered by purchasers, the inventory of cores waiting to be shipped at the consolidation center, invoicing, and other receivables data.

The host processor also preferably includes means for limiting access to the stored data. In a preferred embodiment, access to the data stored by the host processor can only be obtained once the operator of the system opens an account for each vendor and purchaser who desires to use the system. Once an account has been set up, the operator grants the vendor or purchaser means for accessing the data. The means for limiting access may include password protection systems, data encryption with deciphering software being provided to authorized users, or a combination thereof.

Access to the data stored on the host processor may be limited by database, record, field, or transaction. For example, purchasers are preferably permitted to access data relating to the type and quantity of cores available for sale, but are not permitted to access data relating to the identity of the vendors who own the cores available for sale or the minimum price at which such vendors are willing to sell their cores. Similarly, vendors are preferably permitted to access data relating to their own cores available for sale, but are not permitted to access data relating to other vendors' cores. Preferably, the host processor includes vendor and purchaser authentication means either via software or hardware.

The host processor is preferably equipped with electronic communication hardware such as network cards or modems that permit authorized users to electronically connect with the host processor using means such as the Internet or dial-up connection software. Authorized vendors of cores are granted limited electronic access to the data relating to their cores available for sale that is stored on the host as processor so that each such vendor has a self-initiated capability to exclusively access only the vendor's own inventory and pricing information. Such a vendor may add, amend, or delete records in the database pertaining only to the vendor's own cores. Purchasers are granted limited access to the database allowing them to inquire about the availability or pricing of cores, or to order cores.

Other more traditional forms of communications such as e-mail, fax, telecommunication or regular mail may also be utilized to supply data to the host processor and to communicate orders to the host processor. For example, a vendor may fax information relating to cores available for sale to the operator of the host processor who then enters the information relating to the cores into the host processor. Similarly, a purchaser may telephone the operator of the host processor to place an order for cores, or to make inquiries regarding the availability of cores.

In the presently most preferred embodiment, the host processor is interfaced to the vendors and the purchasers as a site accessible by remote terminals through the Internet. Access to the Internet site is provided to the vendors and purchasers, each of whom may access certain data stored on the host processor upon their own initiative remotely through an Internet access provider of their choice. Because this preferred embodiment operates within the framework of the Internet, the system is substantially continuously available to a plurality of vendors and a plurality of purchasers simultaneously, 24 hours a day, 365 days a year.

The system also comprises means for transferring said data from said host processor over a data link to a remote terminal for display to a purchaser of cores. The display means is preferably a video monitor, however an attached printer could also be used. Each remote terminal is preferably equipped with standard input devices such as a keyboard and mouse. Optionally, the remote terminal is equipped with a bar code reader. Vendors can use the bar code reader to scan bar codes corresponding to the OEM number or distinctive part number assigned to a particular type of core. Use of bar code readers expedites data entry and reduces data entry errors and allows a vendor to quickly compile data relating to the cores available for sale.

The data link permits the transfer of data from the host processor to the remote terminals. This permits a purchaser to view data relating to cores available for sale on the display of a remote terminal. Preferably, the data link also permits the transfer of data from the remote terminals to the host processor. This permits vendors to use remote terminals to supply data to the host processor relating to the cores available for sale, and also permits purchasers to transfer orders to purchase cores directly to the host processor. The data link can be an Internet connection, a dial-up connection facilitated by a modem and telephone line, or any other method of transferring data from a host processor to a remote terminal.

It will be appreciated that the data link must be able to transfer data from the host processor to the remote terminals. And while it is advantageous if data can likewise be transmitted over the data link from the remote terminals to the host processor, the system can operate using other means of communication. For example, vendors can supply data relating to the cores available to sale to the operator of the host processor by fax, e-mail, regular mail, or by telephone, and the operator of the host processor can then input the data into the host processor. Similarly, a purchaser can communicate an order to purchase cores to the operator of the host processor by fax, e-mail, regular mail, or by telephone, and the operator of the host processor can then input the data into the host processor. Although these means can be used, it is highly advantageous if communications between the vendors and purchasers and the host processor are made using the remote terminals and data links.

The system also comprises at least one consolidation center. Cores that are included in an order placed by a purchaser are sent to the consolidation center by the vendors. The cores are inspected at the consolidation center to insure that they are saleable and properly identified. The cores are then packaged for shipment to the purchaser according to a set of instructions generated in response to the order. It will be appreciated that a substantial portion of the inspecting and packaging that occurs at the consolidation center can be automated. It will also be appreciated that more than one consolidation center can be utilized in accordance with the invention. In a preferred embodiment of the invention for example, regional consolidation centers located near the remanufacturers' place of business can be used to minimize the distance that cores must be shipped and the concomitant time incurred for shipping. It will be appreciated that the consolidation center may be located either at the same location as the host processor, or at one or more remote locations.

The terms "single delivery" or "single shipment" are sometimes used throughout this specification and in the appended claims to describe the manner in which the cores included in an order are shipped from the consolidation center and delivered to the purchaser. Use of the terms "single delivery" and "single shipment" is not intended to mean that all of the cores included in a particular order must necessarily be delivered to the purchaser at the same time or that they must be packaged for shipment together in the same container. What is intended by the use of such terms is to describe that the cores that are included in a particular order are shipped to the purchaser substantially together as a unit from a consolidation center as opposed to being shipped to the purchaser in small groups from various locations from various parties. It will be appreciated that although it is not preferred, sometimes it is necessary to ship a substantial portion of an order as a unit on one day, with the balance of the order being shipped on another day. Thus, the terms "single delivery" and "single shipment" should not be literally interpreted so as not to include delivery of cores over several days in several containers from a consolidation center. It will also be appreciated that the delivery of the cores included in an order may be accomplished by the purchaser picking up the cores at the consolidation center or some other convenient location.

In order to expedite the filling of orders, the consolidation center preferably maintains an inventory of cores. The operator of the system will authorize one or a plurality of vendors to send specified cores to the consolidation center to be held in inventory. When an order is placed by a purchaser, it can be filled using the cores in inventory at the consolidation center. The vendors who actually sold the cores can then ship their cores to the consolidation center to replenish the cores removed from inventory. The operator of the system tracks the inflow and outflow of cores, and credits the vendors who sold the cores included in the order even if the cores that were included in the order may have actually come from other vendors.

The system also comprises means for generating a single invoice to a purchaser for the cores included in an order. The invoice can be delivered to the purchaser with the cores when the cores are delivered, or it can be sent to the purchaser separate from the cores. It will be appreciated that the invoice can be transmitted electronically to the purchaser.

The operator of the host processor, upon receiving payment from the purchaser for an order of cores, must distribute the proceeds of sale to the plurality of vendors who supplied cores. Preferably, the host processor maintains a transaction log for each order and tracks the quantity and purchase price for each core delivered to the purchaser by each vendor. Prior to issuing payment to the vendor, any fees charged by the operator of the host processor will be deducted. Preferably, the host processor also monitors the status of a purchaser's order, so the purchaser can readily determine when cores are going to be shipped and delivered.

The system according to the present invention will now be described with reference to FIG. 1, which is a block diagram showing the arrangement of various components of the system. The system 100 comprises a host processor 102 having means for storing and processing data supplied by a plurality of vendors 104. In the preferred embodiment, the host processor 102 operates as an SQL server. The data supplied by the vendors 104 comprises the type and quantity of cores each vendor has available for sale. Preferably, the vendor 104 uses one of a plurality of remote terminals 106 and a data link 108 connecting the remote terminal 106 with the host processor 102 to supply the data relating to the cores available for sale to the host processor 102. However, the data can also be provided by the vendor 104 to an operator 110, who can input the data into the host processor 102 for the vendor 104. The data supplied by the plurality of vendors 104 is transferred over a data link 108 to a remote terminal 106 and displayed to a purchaser 112. The purchaser 112 communicates to the host processor 102 and order to purchase one or cores. Preferably, the purchaser 112 uses a remote terminal 106, and a data link 108 to communicate the order to the host processor 102. However, the order can alternatively be communicated by the purchaser 112 to the operator 110, who can input the data into the host processor 102 for the purchaser 112. If the host processor 102 determines that the conditions required to complete the order are met, the vendors 104 having cores that will be part of the order are instructed to send such cores to a consolidation center 114. The cores received from the vendors 104 are inspected at the consolidation center 114 to ensure that they are saleable and were properly identified by the vendors 104. The cores are packaged for shipment to the purchaser 112 preferably as a single delivery according to a set of instructions generated in response to the order.

Figure 2:
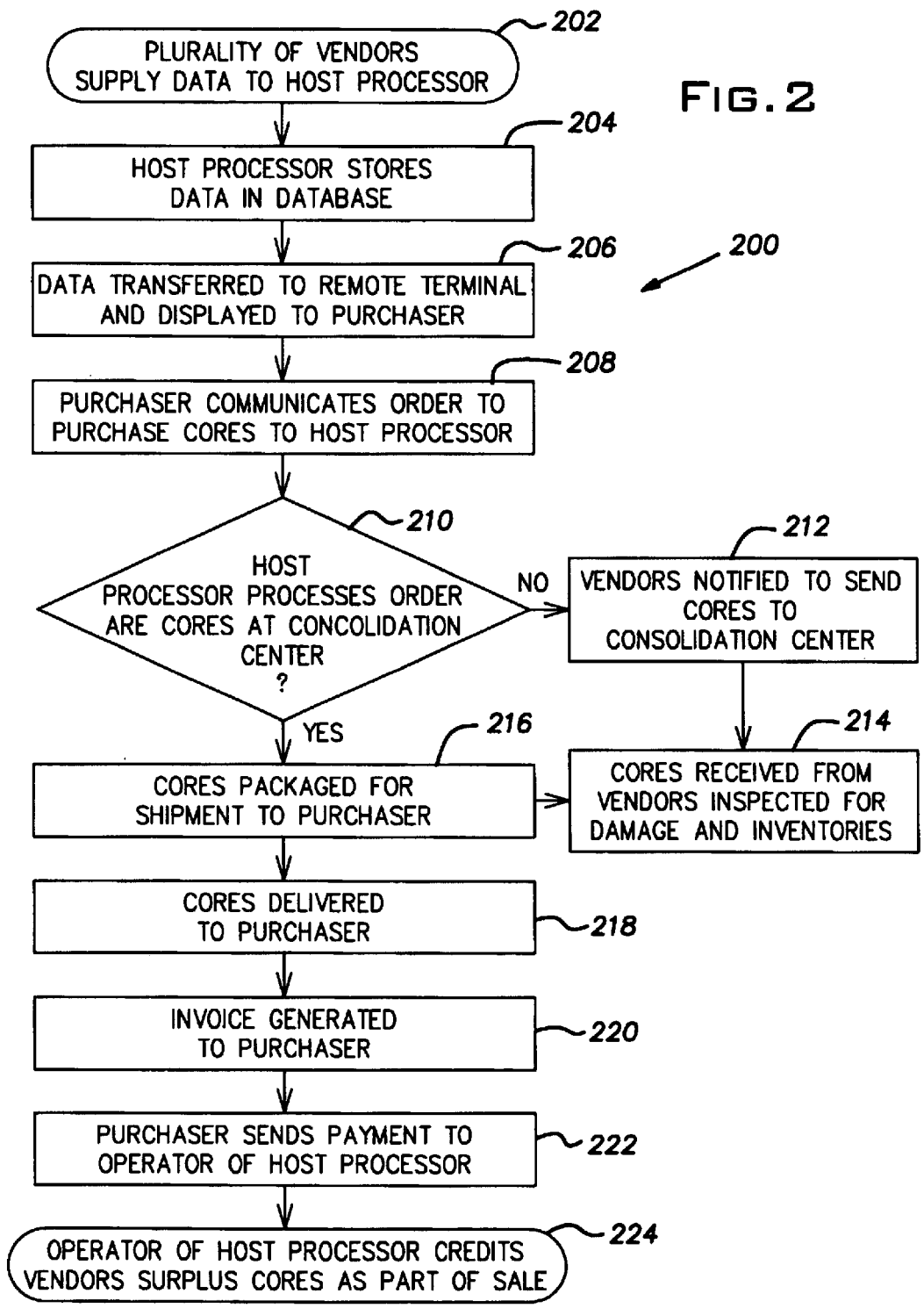
FIG. 2 is a flow chart illustrating a basic logic sequence for a typical sale and shipment of cores as facilitated by the system and method according to the present invention.

The basic logic sequence 200 for a typical sale and shipment of cores as facilitated by the system and method according to the present invention is illustrated with reference to FIG. 2. The reference numbers included in this text reference logic boxes shown in FIG. 2. Initially, a plurality of vendors supply data relating to the cores available for sale to the host processor 202. The host processor stores the data in one or more databases 204. The data is transmitted from the host processor over a data link to a remote terminal where it is displayed to a purchaser 206. After viewing the data displayed on the remote terminal and making a purchasing decision, the purchaser communicates an order for cores to the host processor 208. The order is preferably communicated to the host terminal by the purchaser using a remote terminal and the data link, but can be communicated to an operator of the system via other means. The host processor processes the order 210. In processing the order, the host processor determines whether there are sufficient cores in inventory at the consolidation center to fill the order. If not, the vendors of the cores that are the subject of the sale are instructed to send specified cores to the consolidation center 212. The cores are received at the consolidation center and inspected to insure that they are saleable and properly identified 214. The cores are then placed in inventory. Once there are sufficient cores in inventory at the consolidation center to fill the order (either completely or substantially), the cores are packaged for shipment to the purchaser according to a set of instructions generated by the host processor in response to the order 216. The cores included in the order are then shipped to the purchaser 218, and an invoice is generated to the purchaser for the cores included in the order 220. Payment is then received from the purchaser 222 and appropriate credits are made to the accounts of the vendors who sold cores included in the sale 224.

It will be appreciated that the market value of a particular core can often be affected by factors such as supply and demand. For example, when the supply of a particular core is low and demand is high, the market value of the particular core increases. Conversely, when the supply of a particular core is high and demand is low, the market value of the core decreases. In a preferred embodiment of the present invention, the system and method permit vendors and purchasers to modify pricing to take advantage of changing market conditions. This is accomplished by permitting vendors to also include asking prices, which are minimum acceptable sale prices, as part of the data they supply to the host processor relating to the type and quantity of cores they have available for sale. Purchasers submit an offer price when they communicate an order for cores. The host processor compares the offer price with the asking price, and if the offer price meets or exceeds the asking price for a core, the offer prices is accepted and the host processor notifies the vendor of the particular core and the purchaser that a sale has been made. Such notification can be made by any means, including e-mail. Vendors have the ability to change their asking price in response to market conditions. When vendors have identical asking prices, the orders are filled using cores on a first-in basis. In other words, vendors who supplied information relating to their cores to the host processor first have the first opportunity to participate in supplying cores that are included as part of the order.

Although it is preferred, some vendors may choose not to supply asking prices when they supply data relating to they type and quantity of cores available for sale. In that instance, or in the event that the offer price tendered by the purchaser is less than the asking prices supplied by the vendors, the purchaser's offer can be communicated to the vendors. Communication of the offer price can be by any means, but preferably is accomplished using electronic communication means over the data link to a remote terminal. A particularly preferred means of communicating offer prices to vendors is by e-mail. Vendors can choose to accept the purchaser's offer, and the first vendors to do so are permitted to participate in supplying cores included as part of the order. Vendors can also choose to communicate a counter-offer to the host processor for submission to the purchaser, or vendors can simply do nothing and allow the offer to be rejected. If the offer is not accepted and no-counter offers are received within a predetermined time period, the host processor communicate to the purchaser that the offer price has not been accepted.

Figure 3:
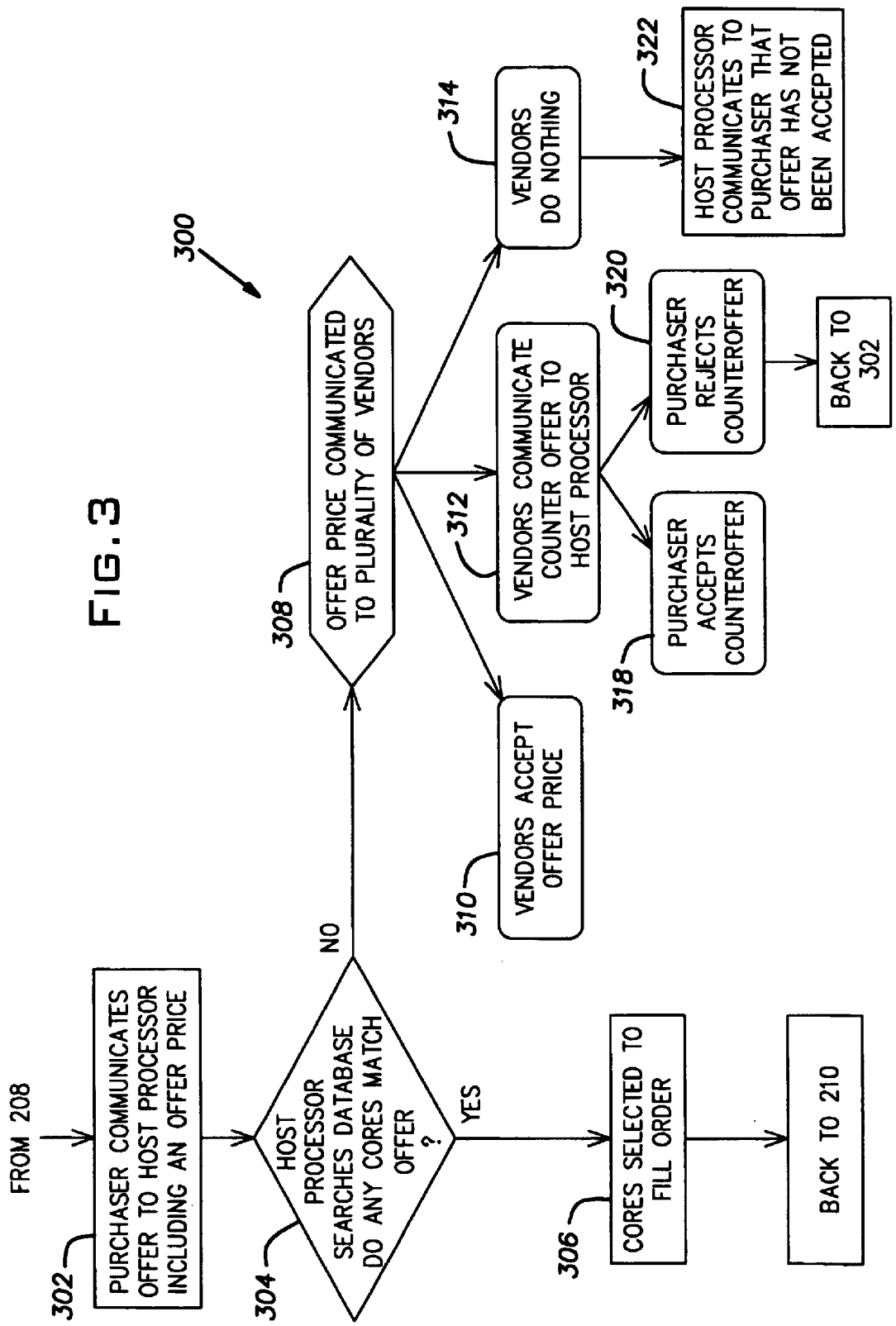
FIG. 3 is a flow chart illustrating a portion of a preferred embodiment of a logic sequence for the sale and shipment of cores as facilitated by the system and method according to the present invention.

FIG. 3 is a flow chart illustrating another embodiment of a logic sequence 300 for the sale and shipment of cores as facilitated by the system and method according to the present invention. In particular, FIG. 3 shows the additional steps that may be required after the purchaser communicates an order to the host computer 208 (in FIG. 2) when: (1) the purchaser's offer price for cores is less than the vendors' asking prices; (2) there are insufficient number of available cores at the vendors asking prices; or (3) the vendors have not submitted asking prices. The reference numbers included in this text reference logic boxes shown in FIG. 3 unless otherwise noted. Initially, a purchaser communicates to the host processor an order for one or more cores displayed on a remote terminal as being available for sale 302. The purchaser's order includes an offer price. The host processor then searches the data stored in one or more databases for all suitable cores for which an asking price was supplied by a vendor that match or are lower than the offer price communicated by the purchaser 304. Cores that meet the offer price are selected to fill the order based upon the date they were entered into the system (i.e., first in—first out) 306. If there are not enough core in the database that meet the purchaser's offer price, the purchaser's offer price is communicated to a plurality of vendors for consideration 308. The vendors can make one of three possible responses within a specified time period: (1) communicate to the host processor acceptance of the purchaser's offer price 310; (2) communicate to the host processor a counter-offer 312; (3) do nothing 314. When a vendor accepts the purchaser's offer price for a core, the core is selected to fill the order 306. The cores selected to fill the offer are preferably determined on a first-to-respond basis. When the number of vendors accepting the purchaser's offer price is insufficient to fill the order, the host processor communicates any counter-offers that have been received to the purchaser for consideration 316. The purchaser can either accept the counter-offer 318 or reject the counter offer 320. If the purchaser accepts the vendor's counter-offer, the cores are selected to fill the order 306. If the purchaser rejects the vendor's counter-offer, the purchaser can resubmit another order with another offer price 302. If the vendors do not respond to the purchaser's offer within a specified period of time, the host processor communicates to the purchaser that the vendors have not accepted his offer price and have not submitted a counter-offer 322. After cores are select to fill the order 306, the host processor determines whether there are sufficient cores at the consolidation center to fill the order 210 (in FIG. 2). The logic sequence as shown in FIG. 2 is followed from that point forward.

While the typical purchaser is usually a remanufacturer, a remanufacturer could be also be a vendor. For example, when a remanufacturer desires to liquidate a surplus inventory of cores, the remanufacturer would assume the role of a vendor and supply data to the host processor relating to the cores available for sale. Similarly, a vendor of cores may choose to purchase cores shown as being available on the system when market conditions have driven market prices down, and then resell the cores when the market conditions are better.

The system and method according to the present invention provide many additional benefits and advantages. The system and method, by offering a real-time database of available cores to purchasers 24 hours a day, 7 days a week, and 365 days a year, essentially permits remanufacturers to use the system as an "electronic warehouse" for cores. Data relating to the types and quantities of cores available for processor regarding the cores such vendor or purchaser has available for sale. The sale are constantly available, and purchasers of cores are able to make purchasing decisions in minutes instead of days or weeks.

The "electronic warehouse" of cores provides purchasers with several cost saving benefits. First, if several consolidation centers are used and are set up in locations near the purchaser' remanufacturing facilities, shipments of cores can be essentially scheduled for "just-in-time" delivery. The remanufacturers do not need to maintain large inventories of cores, nor do the incur the cost to take physical possession of and are house such cores until they are needed. Another benefit involves access to the real-time database of cores. This permits purchasers to view, at their convenience, the supply of available cores on the market. In the past, determining the supply of available cores was speculative at best, and required purchaser to submit requests to core vendors and compile data relating to the availability of cores.

The system and method according to the present invention has two additional features available to purchasers. The first is the ability to use system to request the availability of cores presently not shown as available for sale. FIG. 4 shows one embodiment of a data entry template 400 that is displayed when a purchaser desires to request the availability of cores not presently shown as available for sale. The purpose of this feature is to provide a means for a purchaser to communicate its needs to the core vendor market. With reference to FIG. 4, the purchaser enters certain information in the fields 401 relating to the cores that the purchaser desires to purchase, but which the purchaser cannot find available for sale. The information provided by the purchaser can include, for example, the category of the core, which can be selected from a drop-down menu 402, the part number 403, the description of the core 404, the quantity of such cores needed 405, and the target price 406 that the purchaser is willing to pay for such cores. The purchaser also enters its user name 407 and then submits the request to the host processor by clicking on the submit button 408. Preferably, the information once received by the host processor is electronically communicated to all of the vendors using the system for consideration.

It will be appreciated that the "Request Availability" feature is used when one of two circumstances occur. The first circumstance is when the purchaser has reviewed the core shown as available for sale and has not found the core needed. The second is when the purchaser has reviewed the cores shown as available for sale and has not found a sufficient quantity of cores needed for future production schedules. The "Request Availability" feature permits purchasers of cores the luxury of accurately monitoring the supply of cores and to broadcast the desire for certain cores well in advance of actual need. A purchaser can use the "Request Availability" function as a forecasting tool, generating a supply of cores based on anticipated need before the supply is diminished and demand drives up the cost.

Another benefit to purchasers is the ability to anonymously post surplus inventory for sale on the market to other remanufacturers. FIG. 5 shows one embodiment of a data entry template 500 that is displayed on a remote terminal when a vendor or purchaser desires to directly submit information electronically to the host processor regarding the cores such vendor or purchaser has available for sale. The information provided by the vendor (note: a purchaser posting surplus inventory is a vendor for purposes of this description) can include, for example, the category of the core 501 which can be selected from a drop-down menu 502, the part number 503, the quantity of such cores available for sale 504, and the selling price 505 for which the vendor is willing to sell the cores. The vendor also enters its user name 506 and then submits the data to the host processor by clicking on the submit button 507.

The disposal of surplus inventories of cores is a common problem for many remanufacturers. Selling surplus inventories is often difficult because generally the only prospective purchasers for the surplus inventory are competitors. The ability of a remanufacturer to post the surplus inventory for sale anonymously using the system and method according to the present invention permits remanufacturers to reduce their surplus inventories without disclosing information to competitors.

FIG. 6 shows one embodiment of a data entry template 600 that a purchaser can use to search or browse available core inventories. The purchaser can provide such information in the fields 601 such as the category of core the purchaser wishes to browse, which can be selected from a drop-down menu 602. If the purchaser is interested in a specific core, the purchaser can search or browse by part number 603 of other description or part number such as a Lester number 604. Once the information is entered in the appropriate fields 601, the purchaser submits the request by clicking on the search button 605.

Additional advantages and modifications will readily occur to those skilled in the art. Therefore, the invention in its broader aspects is not limited to the specific details and illustrative embodiments shown and described herein. Accordingly, various modifications may be made without departing from the spirit or scope of the general inventive concept as defined by the appended claims and their equivalents.

What is claimed is:

1. A system for facilitating the sale and shipment of cores comprising:

a host processor having means for storing and processing data supplied by a plurality of vendors said data comprising the type, quantity and asking price of cores said vendors have available for sale, and sequence in which said data is submitted;

means for transferring said data from said host processor over a data link to a remote terminal for display to a purchaser of cores; and means for communicating an order from said purchaser to said host processor, said order comprising an offer price to purchase at least one of said cores displayed on said remote terminal;

wherein said host processor further comprises means for comparing said offer price with said asking price for each of said cores based on said sequence in which said data was submitted;

means for determining that predetermined conditions to complete said order have been met;

means responsive to said means for determining for notifying a vendor of at least one core in said sequence and said purchaser that a sale has been made, when said offer price meets or exceeds said asking price for a core;

means for instructing to said vendor of said core to send said core to a consolidation center;

means at said consolidation center for inspecting cores received from each of said vendors and means for packaging said cores for shipment to said purchaser according to a set of instructions generated by said host processor in response to said order; and means for generating an invoice to said purchaser for the cores included in said order.

2. The system according to claim 1 wherein said host processor notifies said vendor and said purchaser that a sale has been made by e-mail.

3. The system according to claim 1 wherein at least one of said vendors supplies data to said host processor using a remote terminal.

4. The system according to claim 1 wherein said data link comprises an internet connection or a modem and telephone line.

5. The system according to claim 1 wherein said purchaser communicates said order to said host processor using said remote terminal.

6. The system according to claim 1 wherein said host processor further comprises means for limiting access to said data to only authorized vendors and purchasers.

7. The system according to claim 1 wherein said host processor further comprises means for permitting a purchaser to search or sort said data by category, part number, or description.

8. The system according to claim 1 further comprising:

means for a purchaser to communicate to said host processor a request to purchase cores that are not displayed on said remote terminal as being available for sale; and means for communicating said request to said vendors.

9. The system according to claim 1 wherein said order comprises cores that have been received at said consolidation center from a plurality of vendors and repackaged for shipment to said purchaser as a single delivery.

10. The system according to claim 1 wherein the identity of said vendors is not disclosed to said purchaser.

11. The system according to claim 1 further comprising means for said vendors to change the asking price for their cores.

12. A system for facilitating the sale and shipment of cores comprising:

a host processor having means for storing and processing data supplied by a plurality of vendors, said data comprising the type and quantity of cores said vendors have available for sale, and sequence in which said data is submitted;

means for transferring said data from said host processor over a data link to a remote terminal for display to a purchaser of cores;

means for communicating an order from said purchaser to said host processor, said order comprising an offer price to purchase at least one of said cores displayed on said remote terminal;

wherein said host processor further comprises means for communicating said offer price to said vendors, and means for communicating to said purchaser that said order cannot be completed when said offer price has not been accepted by enough vendors willing to agree to accept said offer price for their cores to complete said purchaser's order, wherein when said order can be completed by a vendor, means for providing shipment instructions to said vendor;

at least one consolidation center having means for inspecting cores received from said vendors and means for packaging said cores for shipment to said purchaser according to a set of instructions generated by said host processor in response to said order by said purchaser; and means for generating an invoice to said purchaser for the cores included in said order.

13. The system according to claim 12 wherein said host processor further comprises means for communicating a counter-offer from a vendor to said purchaser.

14. A system for facilitating the sale and shipment of cores comprising:

a host processor having means for storing and processing data supplied by a plurality of vendors, said data comprising the type and quantity of cores each of said vendors has available for sale, and sequence in which said data is submitted, said data further comprising an asking price for said cores;

means for transferring said data from said host processor over a data link to a remote terminal for display to a purchaser of cores;

means for said host processor to receive an order from said purchaser to purchase at least one of said cores displayed as available for sale on said remote terminal, said order comprising an offer price for at least one of said cores;

said host processor further comprising means for comparing said offer price with said asking price for said cores based on said sequence in which said data was submitted;

said host processor further comprising means for determining that predetermined conditions to complete said order have been met;

means responsive to said means for determining for notifying a vendor of at least one core in said sequence and said purchaser that a sale has been made, if said offer price meets or exceeds said asking price for a core;

means for instructing to said vendor of said core to send said core to a consolidation center;

said host processor further comprising means for communicating said offer price to other vendors, if said offer price does not meet or exceed the asking price for enough cores to complete said order; and means responsive to said means for determining for notifying a vendor of said core in said sequence and said purchaser that a sale of said core has been made, if at least one of said other vendors communicates to said host processor a willingness to accept said offer price for a core; and means for instructing to said other vendor of said core to send said core to said consolidation center;

said host processor further comprising means for communicating to said purchaser that said order cannot be completed because said offer price has not been accepted by enough vendors, if there are not enough vendors willing to agree to accept said offer price to complete said purchaser's order;

means at said consolidation center for inspecting cores received from said vendors and means for packaging said cores for shipment to said purchaser according to a set of instructions generated by said host processor in response to said order; and means for generating an invoice to said purchaser for the cores included in said order.

15. A system for facilitating the sale and shipment of cores comprising:

a host processor having means for storing and processing data supplied by a plurality of vendors, the data supplied by each vendor comprising:

the identity of the vendor supplying the data;

the type and quantity of cores the vendor has available for sale;

the asking price of the cores the vendor has available for sale, and sequence in which the data is submitted;

means for transferring a portion of the data stored on the host processor to a purchaser of cores over a data link to a remote terminal for display to purchaser, wherein the displayed data does not include the identity of the vendor; and means for communicating an order from the purchaser to the host processor, the order comprising an offer price to purchase at least one core;

wherein the host processor further comprises means for comparing the offer price with the asking prices of corresponding cores based on the sequence in which the data was submitted;

means for determining whether or not predetermined conditions to complete the order have been met;

means responsive to the means for determining for notifying the vendor of the core in the sequence and the purchaser that a sale has been made, when the offer price meets or exceeds the asking price for a core; and means responsive to the means for determining for communicating the offer price to the vendors, when the offer price does not meet or exceed the asking price for the core; and means for communicating to the purchaser that the order cannot be completed when the offer price has not been accepted by enough vendors willing to agree to accept the offer price for their cores to complete the purchaser's order;

means for providing shipment instructions to the vendor;

at least one consolidation center having means for inspecting cores received from the vendors and means for packaging the cores for shipment to the purchaser according to a set of instructions generated by the host processor in response to the order by the purchaser;

and means for generating an invoice to the purchaser for the cores included in the order.

16. The system according to claim 15 wherein the displayed data does not include the asking price of the cores available for sale.

17. The system according to claim 15 wherein the host processor further comprises means for communicating a counter-offer received from a vendor to the purchaser.

18. The system according to claim 15 further comprising:

means for the purchaser to communicate to the host processor a request to purchase cores that are not displayed on the remote terminal as being available for sale; and means for communicating the request received from the purchaser to the vendors.

19. The system according to claim 15 further comprising means for permitting the vendors to change the asking price for their cores.

20. The system according to claim 15 wherein the host processor notifies the vendor and the purchaser that a sale has been made by e-mail.

21. The system according to claim 15 wherein the purchaser communicates the order to the host processor using the remote terminal.

22. The system according to claim 15 wherein the host processor further comprises means for limiting access to the data to only authorized vendors and purchasers.

* * * * *